United States Patent [19]

Onorato et al.

[11] Patent Number: 5,045,440
[45] Date of Patent: Sep. 3, 1991

[54] STABILIZATION OF OPTICAL INFORMATION STORAGE MEDIA BY INCORPORATION OF NITROGEN CONTAINING COMPOUNDS

[75] Inventors: Frank J. Onorato, Phillipsburg; David E. Nikles, Colonia; Rachel S. Kohn, Springfield; Susan C. Castles, South River; Harris A. Goldberg, Colonia, all of N.J.

[73] Assignee: Hoechst Celanese Corp., Somerville, N.J.

[21] Appl. No.: 477,270

[22] Filed: Feb. 7, 1990

[51] Int. Cl.$^5$ .......................... G03C 1/00; G03C 1/72; B32B 3/02
[52] U.S. Cl. .................................. 430/495; 430/270; 430/945; 428/64; 346/135.1
[58] Field of Search .................... 430/945, 495, 270; 428/64; 346/135.1

[56] References Cited

U.S. PATENT DOCUMENTS

| | | | |
|---|---|---|---|
| 3,912,844 | 10/1975 | Endo et al. | 430/348 |
| 4,492,750 | 1/1985 | Law et al. | 430/495 |
| 4,605,607 | 8/1986 | Nikles et al. | 430/945 |
| 4,770,975 | 9/1988 | Hirose et al. | 430/495 |
| 4,913,949 | 4/1990 | Steininger et al. | 430/945 |

Primary Examiner—Charles L. Bowers, Jr.
Assistant Examiner—Ashley I. Pezzner
Attorney, Agent, or Firm—Burns, Doane, Swecker & Mathis

[57] ABSTRACT

Provided is a method for stabilizing an optical information medium by incorporating an effective amount of a specific nitrogen containing compound into the medium. The specific nitrogen containing compounds are poly(2-vinyl pyridine), poly(4-vinyl pyridine), pentaethylene hexamine and acridine orange base. Incorporation of one of the nitrogen compounds into the optical information medium prolongs the useful life of the medium.

9 Claims, 2 Drawing Sheets

STABILIZATION OF OPTICAL INFORMATION STORAGE MEDIA BY INCORPORATION OF NITROGEN CONTAINING COMPOUNDS

BACKGROUND OF THE INVENTION

The present invention pertains generally to the stabilization of optical information recording media. More particularly, this invention relates to a method for stabilizing optical information recording media through the use of a suitable nitrogen containing compound.

The recording medium, of course, is one of the key elements in any optical information storage system. The commercial viability of the recording medium depends upon such technical parameters as the sharpness in recording and playback of the information, i.e., a high signal to noise ratio, and the medium's stability, e.g., the length of time before the onset of degradation of the optical properties. The longer one can delay the onset of degradation, the better chance one has of prolonging the overall useful life of the medium.

Various methods have been utilized in an attempt to prolong the useful life of optical recording media. Two methods of increasing the chemical and mechanical stability of optical recording media have included the use of a protective layer (Japanese Patent Application Laid Open Nos. 57-60542 and 57-66541), and the use of a "sandwich structure". Another method used to increase the useful lifetime of an optical recording medium includes the use of a thermal and/or mechanical barrier layer. U.S. Pat. No. 4,340,655 employs the use of a thermal and mechanical layer for the purpose of protecting the recording layer from defects such as scratches, dirt and fingerprints. Another function of the thermal and mechanical barrier layer is to prevent the material which is vaporized from the recording layer from depositing on the optical system and other components of the recording apparatus.

Stabilizers have also been suggested for use in various layers of the optical recording medium, all directed to extending the useful life of the overall medium. For example, U.S. Pat. Nos. 4,707,431 and 4,614,705 disclose the use of a preservation stabilizer in a monoacrylate or monomethacrylate underlayer as a means of stabilizing said underlayer. Suitable underlayer preservation stabilizers include quaternary ammonium chloride, diethylhydroxamine, a cyclic amide, a nitryl compound, substituted urea, benzothiazole, 4-amino-2,2,6,6-tetramethylpiperidine, bis(1,2,2,6,6-pentamethyl-4-piperidinyl)sebacate, various organic acids, and hydroquinone. U.S. Pat. No. 4,707,431 also discloses the use of a triaryl amino compound or a transition metal complex as a recording layer stabilizer.

Because of the potential value of stable optical information recording materials which have long useful lives, the search for techniques, treatments and useful stabilizers to increase the stability and useful life of such media continues.

Accordingly, it is an object of the present invention to provide a simple and commercially viable method for improving the stability of optical information recording media.

It is another object of the present invention to provide a simple and commercially viable process for stabilizing optical information recording media by incorporating a specific nitrogen containing compound into the media.

Yet another object of the present invention is to prepare an optical information storage medium which exhibits a longer useful life and which also exhibits improved performance over time due to a delay in the onset of degradation of the medium's optical properties.

These and other objects, as well as the scope, nature, and utilization of the invention, will be apparent to those skilled in the art from the following description and the appended claims.

SUMMARY OF THE INVENTION

In accordance with the foregoing objectives, there is provided a novel method for stabilizing an optical information recording medium which comprises incorporating an effective amount of a suitable nitrogen containing compound into the optical information recording medium. The specific nitrogen containing compounds found to be useful are poly(2-vinyl pyridine), poly(4-vinyl pyridine), pentaethylene hexamine and acridine orange base, [i.e., 3,6-bis(diethylamino)acridine]. These nitrogen compounds can be incorporated into the optical recording medium, e.g., optical disk, in any manner. Incorporation into the substrate, recording layer, or protective layer are all suitable, as is a coating on the inside of a protective cover.

In another embodiment, there is provided a stabilized optical recording medium comprised of a nitrogen containing compound of the present invention incorporated into the medium.

DESCRIPTION OF THE PREFERRED EMBODIMENTS

Figure 1:
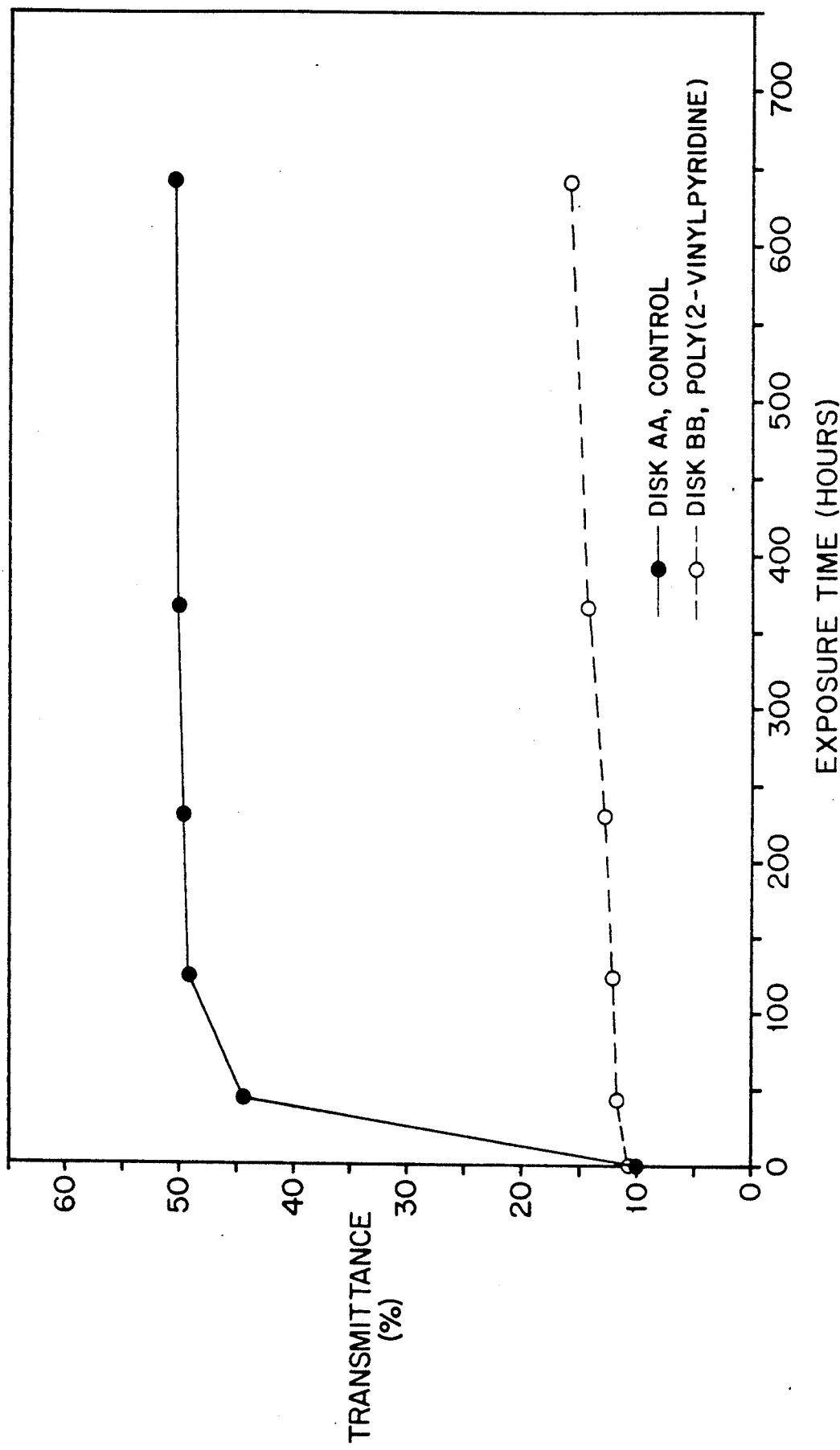
FIGS. 1 and 2 graphically depict the effect over time of an accelerated aging environment on the % transmittance of an optical recording medium in which a particular nitrogen containing compound has been incorporated.

The present invention provides a simple and commercially feasible process for increasing the stability of optical information recording media. The process comprises incorporating an effective amount of a suitable nitrogen containing compound into an optical information storage medium. More specifically, an effective amount of a suitable nitrogen containing compound is integrated into the construction of the optical information recording medium. The resultant optical recording medium exhibits excellent stability in that the onset of degradation in the optical properties is substantially delayed.

The only specific nitrogen containing compounds which have been found to be useful in the practice of the present invention are poly(2-vinyl pyridine), poly(4-vinyl pyridine), pentaethylene hexamine and acridine orange base [i.e., 3,6-bis(diethylamino)acridine].

The optical information recording medium according to the present invention comprises a suitable substrate material and a recording layer. When deemed desirable, a subbing layer may be formed on the substrate or a protective layer can be formed on the recording layer. Examples of other layers which can be incorporated into an optical information storage medium according to the present invention include: a protective cover, a spacer layer, or a reflecting layer.

Construction of an optical information storage medium according to the present invention begins with the appropriate substrate material. The substrate must be transparent to the laser beam used when writing is effected from the substrate side, but has no necessity of being transparent when writing is effected from the recording layer side. As the substrate, conventional materials such as glass; plastics such as polyester resins, polyamide resins, polyolefin resins, polycarbonate resins, epoxy resins, polyimide resins, acrylic resins (for instance, polyacrylic or polymethacrylic ester), methacrylic resins, polystyrene resins, cellulose resins; metals; and ceramics can be used. Among the foregoing, plastics are preferably used because they are light and exhibit excellent physical and optical properties. The most preferred substrates are epoxy resin substrates and polycarbonate comprising substrates.

The substrate materials may be provided with a groove for guiding the laser beam. Such a groove can be provided during injection molding of the substrate. It is a preferred embodiment of the present invention to use a pre-grooved substrate material.

The substrate which is coated with the information layer should generally possess a surface of suitable smoothness. This may be imparted by appropriate molding or other forming techniques when the substrate is made. If the substrate has an inadequately smooth surface, a smoothing or subbing polymer layer may be used to attain the appropriate smoothness. Such a smoothing or subbing layer should not, of course, interfere with the application or utilization of the recording layer which is subsequently applied thereto. The subbing layer can contain preformatting information.

The construction of the optical information storage medium further requires that the substrate be coated with a suitable optical information recording material. Materials for forming a recording layer may be any of the conventional organic or inorganic materials useful in optical information media. Organic materials are generally superior to metallic materials with respect to oxygen-resistance and stability. Among the organic materials, naphthalocyanine, phthalocyanine, anthracyanine, phenanthracyanine and porphyrin ohromophores are particularly preferred because they exhibit excellent absorption properties and good stability. Any appropriate naphthalocyanine, phthalocyanine, anthracyanine, phenanthracyanine or porphyrin chromophore can be used. However, the most preferred chromophore is a naphthalocyanine, and in particular a silicon naphthalocyanine.

It is possible to employ any of the chromophores of the present invention alone or in combination with a suitable film-forming polymer. Combination of the chromophore and film-forming polymer requires that the chromophore be dissolved with a polymer in a mutually suitable solvent and spread together as a film on the surface of the treated substrate. It is preferred to use a chromophore which exhibits good film-forming properties and which can be cast without the presence of a substantial amount of a film-forming polymer.

The film, when applied, must provide a very flat surface in order to avoid errors and noise. In order to facilitate the coating procedure for a polymer/chromophore combination, it is also generally advantageous that the polymer and chromophore be soluble in a readily available organic solvent such as an alcohol or ketone. In this regard the polymer and chromophore should be compatible and mutually co-soluble. Also, upon evaporation of the solvent, the chromophore should not precipitate in a particulate form, which particulates would cause a scattering of light.

Any suitable coating technique may be used to achieve such a flat surface, with a conventional technique such as spin coating, which allows for a high degree of control over film thickness and flatness, being preferred. It is, of course, important that a thin film coating be formed.

A suitable protective layer or protective cover, such as those known to the art, can also be used if desired to protect the recording layer form dirt, dust, scratches or abrasion.

To stabilize the optical information recording material, an effective amount of a suitable nitrogen containing compound in accordance with the present medium can be added either directly to the chromophore solution before casting, or it can be added in or as another suitable layer in the optical medium structure. For example, the compound can be added into the substrate, e.g., during the injection molding process, or it can be incorporated as a separate layer on the substrate, incorporated into a protective layer, or incorporated into the medium structure as a coating under a protective cover. The four specific nitrogen containing compounds of the present invention have been found to be useful wherever they are incorporated into the medium structure, as long as they are present within the structure.

Incorporating the nitrogen containing compound directly into the recording layer can be accomplished as follows. First, an effective amount of the suitable nitrogen containing compound and an appropriate recording material are dissolved in a operative amount of a solvent. The solution can be heated in order to dissolve the nitrogen containing compound and chromophore into solution as rapidly and as completely as possible. The solution is then mixed until dissolution is virtually complete at which point the solution is preferably filtered to remove impurities and undissolved material. It is preferred to filter away the particles present in solution of a size greater than about 0.2 $\mu$m. The solution is then coated onto a suitable substrate using an acceptable coating method such as spin coating. The fully assembled disks can then be baked. The amount of time the medium is baked and the temperature of the bake should be sufficient to remove excess moisture and solvent from the disk, yet not be long enough or hot enough to adversely affect the medium.

A pair of the thus fabricated recording mediums can be superimposed in such a manner that each recording layer comes face to face with each other so as to form an air space therebetween, thereby constructing a sealed air-sandwich type recording medium. Alternatively, a sealed sandwich type recording medium can be constructed by tightly sealing a pair of the recording medium with a protective layer interposed therebetween.

The degree of stabilization achieved through the use of the nitrogen containing compounds of the present invention depends on the quantity of the nitrogen compound employed. Any suitable amount can be used. However, the preferred quantity of nitrogen containing compound employed when incorporation is desired into the information layer ranges from about 1 to about 30 weight percent, and more preferably ranges from about 1 to about 10 weight percent of the information layer. Similar amounts of the nitrogen containing compounds can be used for incorporation into the substrate, as a separate layer over the substrate, or as a "sink" layer on the inside of a protective cover.

The effectiveness of the nitrogen containing compound, and hence the improved useful life of the optical information medium, can be gauged by observing the transmission and reflectance factors of the medium over time as measured under accelerated aging conditions. An increase in stability is reflected by a decelerated increase over time in the transmission factor(T) and/or a decelerated decrease over time in the reflectance factor(R). A slowed change over time in the transmission and reflectance factors indicate a prolongation of the useful lifetime of the optical information storage medium.

The following examples are given to demonstrate the preparation of optical information recording media in accordance with the present invention and the effect of adding the nitrogen containing compounds of the present invention has on the resulting optical information recording media. It is understood that these examples are given by way of illustration and are not meant to limit the disclosure or the claims to follow. All percentages set forth in the following examples, and elsewhere in the specification, are by weight unless otherwise stated.

EXAMPLE 1

A nitrogen containing compound was added to an excess amount of cyclopentanol solvent (about 10 ml). The solution was stirred on a hot plate at a low setting for approximately 40 minutes. The resulting solution was allowed to cool to room temperature, and as it did so it remained clear and without evidence of any precipitation. A silicon naphthalocyanine chromophore (about 0.35 grams) was added to the solution and the solution was then heated and stirred for about 30 minutes. The solution was removed from the hot plate and allowed to cool to room temperature at which point it was passed through a filter excluding all particles over 0.2 microns in size, thereby yielding a purified naphthalocyanine chromophore solution.

The naphthalocyanine chromophore solution containing the nitrogen compound was then spin coated at 1600 rpm for 60 sec. onto a flat, 130 mm polycarbonate disk. The coated polycarbonate disk was then baked for 20 minutes at a temperature of 80° C. in a convection oven to evaporate the solvent and any additional moisture present on the disk. This procedure was repeated for a second disk using the same nitrogen containing compound and silicon naphthalocyanine chromophore, and a pair of media were then superimposed so as to form an air space therebetween in order to construct a sealed air sandwich recording medium. The reflectance factor of the air sandwich optical disk was measured on a Zygo model 1001 spectrophotometer system and the transmission factor of the disk was measured on a spectrophotometer.

The amount of the nitrogen compound employed was sufficient to result in a concentration of the nitrogen compound in the information layer of about 5 weight percent.

The above procedure was repeated for several other nitrogen containing compounds, as well as for a control recording medium which contained no nitrogen containing compound. The transmittance and reflectance were measured and recorded for each of the disks.

One-half of the prepared disks were then exposed to an environment of 80° C./80% RH for an extended period of time. The other half of the prepared disks were exposed to an environment of 65° C./80% RH for an extended period of time. Periodically, the disks were removed from the accelerated aging environment in order to measure the reflectance and transmittance. The results are recorded in the following Table 1.

TABLE 1

Disks exposed to 80°/80% R.H. in the controlled environment chamber. Polycarbonate air sandwiches with 5 weight percent additive in the recording layer. Optical measurements made at 830 nm.

| Disk (additive) | Exposure time (hrs) | % T | % R |
| --- | --- | --- | --- |
| Disk A | 0.0 | 12.0 | 20.4 |
| Control | 43.6 | 15.8 | 18.4 |
|  | 164.7 | 44.3 | 12.1 |
|  | 252.6 | 49.1 | 11.7 |
|  | 368.5 | 59.7 | 13.8 |
|  | 535.8 | 51.0 | 11.6 |
|  | 611.7 | 57.4 | 13.1 |
|  | 813.2 | 55.2 | 12.6 |
|  | 879.1 | 57.3 | 13.0 |
|  | 1045.2 | 52.0 | 11.7 |
|  | 1215.4 | 52.4 | 11.6 |
|  | 1383.1 | 51.1 | 11.1 |
|  | 1549.3 | 51.0 | 11.0 |
|  | 1720.6 | 51.1 | 11.0 |
|  | 2014.4 | 51.1 | 11.1 |
| Disk B | 0.0 | 11.2 | 19.7 |
| poly(4-vinyl-pyridine) | 43.6 | 13.4 | 18.2 |
|  | 164.7 | 15.0 | 17.5 |
|  | 252.6 | 16.2 | 16.9 |
|  | 368.5 | 22.6 | 19.0 |
|  | 535.8 | 24.3 | 14.4 |
|  | 611.7 | 31.5 | 15.1 |
|  | 813.2 | 44.3 | 13.0 |
|  | 879.1 | 44.3 | 11.7 |
|  | 1045.2 | 46.7 | 11.5 |
|  | 1215.4 | 48.8 | 11.4 |
|  | 1383.1 | 48.4 | 10.9 |
|  | 1549.3 | 49.5 | 10.9 |
|  | 1720.6 | 50.1 | 11.0 |
|  | 2014.4 | 51.4 | 11.0 |
| Disk C | 0.0 | 10.0 | 21.6 |
| pentaethyl-enehexamine | 43.6 | 13.4 | 18.4 |
|  | 164.7 | 15.0 | 17.1 |
|  | 252.6 | 15.8 | 16.7 |
|  | 368.5 | 21.4 | 19.0 |
|  | 535.8 | 23.6 | 11.9 |
|  | 611.7 | 31.4 | 15.3 |
|  | 813.2 | 52.5 | 12.2 |
|  | 879.1 | 53.9 | 11.6 |
|  | 1045.2 | 55.3 | 11.3 |
|  | 1215.4 | 56.7 | 11.2 |
|  | 1383.1 | 55.7 | 10.9 |
|  | 1549.3 | 56.4 | 10.9 |
|  | 1720.6 | 56.4 | 11.0 |
|  | 2014.4 | 57.2 | 11.1 |
| Disk D | 0.0 | 12.1 | 19.9 |
| poly(2-vinyl-pyridine) | 43.6 | 14.9 | 17.7 |
|  | 164.7 | 18.2 | 16.0 |
|  | 252.6 | 28.6 | 12.9 |
|  | 368.5 | 54.9 | 13.5 |
|  | 535.8 | 50.7 | 11.1 |
|  | 611.7 | 52.2 | 11.3 |
|  | 813.2 | 56.3 | 12.0 |
|  | 879.1 | 55.0 | 11.7 |
|  | 1045.2 | 52.8 | 11.1 |
|  | 1215.4 | 53.4 | 11.1 |
|  | 1383.1 | 52.2 | 10.9 |
|  | 1549.3 | 52.9 | 10.6 |
|  | 1720.6 | 52.9 | 10.6 |
|  | 2014.4 | 53.4 | 10.6 |
| Disk E | 0.0 | 10.4 | 21.3 |
| proton sponge | 43.6 | 17.9 | 18.2 |
|  | 164.7 | 46.7 | 12.4 |
|  | 252.6 | 48.2 | 12.3 |
|  | 368.5 | 59.0 | 14.6 |
|  | 535.8 | 49.9 | 12.3 |
|  | 611.7 | 48.5 | 11.8 |
|  | 813.2 | 54.5 | 13.2 |

TABLE 1-continued

| Disk (additive) | Exposure time (hrs) | % T | % R |
|---|---|---|---|
| | 879.1 | 53.7 | 12.9 |
| | 1045.2 | 50.6 | 12.2 |
| | 1215.4 | 51.3 | 12.0 |
| | 1383.1 | 49.7 | 11.5 |
| | 1549.3 | 49.9 | 11.4 |
| | 1720.6 | 49.8 | 11.4 |
| | 2014.4 | 49.9 | 11.4 |
| Disk F acridine orange base | 0.0 | 10.3 | 21.6 |
| | 43.6 | 12.3 | 19.2 |
| | 164.7 | 15.3 | 17.4 |
| | 252.6 | 19.4 | 15.8 |
| | 368.5 | 33.5 | 15.8 |
| | 535.8 | 42.9 | 11.7 |
| | 611.7 | 48.5 | 11.8 |
| | 813.2 | 55.9 | 12.0 |
| | 879.1 | 55.0 | 11.7 |
| | 1045.2 | 52.6 | 11.2 |
| | 1215.4 | 53.4 | 11.1 |
| | 1383.1 | 52.0 | 10.7 |
| | 1549.3 | 52.0 | 10.7 |
| | 1720.6 | 52.1 | 10.7 |
| | 2014.4 | 52.4 | 10.8 |
| Disk G triethanolamine | 0.0 | 11.3 | 20.3 |
| | 43.6 | 16.1 | 17.9 |
| | 164.7 | 44.2 | 12.1 |
| | 252.6 | 47.6 | 12.0 |
| | 368.5 | 57.9 | 14.1 |
| | 535.8 | 49.4 | 11.9 |
| | 611.7 | 56.3 | 13.3 |
| | 813.2 | 53.8 | 12.7 |
| | 879.1 | 52.1 | 12.2 |
| | 1045.2 | 50.5 | 11.8 |
| | 1215.4 | 50.9 | 11.7 |
| | 1383.1 | 49.4 | 11.2 |
| | 1549.3 | 49.6 | 11.2 |
| | 1720.6 | 49.8 | 11.2 |
| | 2014.4 | 50.0 | 11.2 |
| Disk H tyramine | 0.0 | 13.6 | 18.8 |
| | 43.6 | 19.1 | 15.8 |
| | 164.7 | 44.2 | 12.0 |
| | 252.6 | 49.3 | 11.8 |
| | 368.5 | 60.6 | 14.0 |
| | 535.8 | 51.4 | 11.8 |
| | 611.7 | 55.1 | 12.6 |
| | 813.2 | 56.2 | 12.8 |
| | 879.1 | 55.5 | 12.5 |
| | 1045.2 | 52.4 | 11.8 |
| | 1215.4 | 53.0 | 11.6 |
| | 1383.1 | 51.4 | 11.1 |
| | 1549.3 | 51.5 | 11.1 |
| | 1720.6 | 51.6 | 11.1 |
| | 2014.4 | 51.7 | 11.1 |

Following disks exposed to 65°/80% R.H. in the controlled environment chamber. Polycarbonate air sandwiches with 5 weight percent additive. Optical measurements made at 830 nm.

| Disk (additive) | Exposure time (hrs) | % T | % R |
|---|---|---|---|
| Disk I control | 0.0 | 12.4 | 19.7 |
| | 43.7 | 12.3 | 19.8 |
| | 141.5 | 14.6 | 19.0 |
| | 224.9 | 15.4 | 18.4 |
| | 336.9 | 20.2 | 21.6 |
| | 501.5 | 18.6 | 17.6 |
| | 577.5 | 21.6 | 18.9 |
| | 779.1 | 27.5 | 16.7 |
| | 930.1 | 35.5 | 14.1 |
| | 1161.6 | 46.0 | 11.3 |
| | 1428.7 | 47.5 | 10.9 |
| | 1571.9 | 47.9 | 10.9 |
| | 1810.2 | 48.2 | 10.8 |
| | 2125.2 | 48.6 | 10.8 |
| | 2388.7 | 48.4 | 10.7 |
| | 2609.2 | 48.6 | 10.6 |
| | 2912.4 | 48.6 | 10.6 |
| Disk J poly(4-vinylpyridine) | 0.0 | 12.3 | 19.7 |
| | 43.7 | 12.0 | 19.3 |
| | 141.5 | 12.4 | 18.8 |
| | 224.9 | 12.6 | 18.5 |
| | 336.9 | 13.8 | 19.4 |
| | 501.5 | 13.6 | 18.6 |
| | 577.5 | 15.4 | 20.2 |
| | 779.1 | 16.1 | 18.5 |
| | 930.1 | 16.1 | 19.7 |
| | 1161.6 | 15.3 | 17.8 |
| | 1428.7 | 15.9 | 17.2 |
| | 157.19 | 16.1 | 17.2 |
| | 1810.2 | 16.6 | 16.9 |
| | 2125.2 | 17.4 | 16.8 |
| | 2388.7 | 18.3 | 16.3 |
| | 2609.2 | 19.2 | 15.7 |
| | 2912.4 | 20.4 | 15.4 |
| | 3224.2 | 21.7 | 14.8 |
| | 3655.9 | 24.1 | 14.0 |
| | 4159.2 | 28.2 | 12.9 |
| | 4930.4 | 37.0 | 10.9 |
| | 5461.9 | 42.9 | 10.5 |
| | 6421.4 | 48.1 | 10.6 |
| | 7767.6 | 48.8 | 10.5 |
| | 8511.9 | 49.5 | 10.5 |
| Disk K pentaethylenehexamine | 0.0 | 10.4 | 21.6 |
| | 43.7 | 11.8 | 19.4 |
| | 141.5 | 12.4 | 18.5 |
| | 224.9 | 12.7 | 17.9 |
| | 336.9 | 14.6 | 19.1 |
| | 501.5 | 13.9 | 17.4 |
| | 577.5 | 16.1 | 18.7 |
| | 779.1 | 16.7 | 18.5 |
| | 930.1 | 16.8 | 18.2 |
| | 1161.6 | 15.8 | 16.5 |
| | 1428.7 | 17.1 | 15.7 |
| | 157.19 | 17.4 | 15.7 |
| | 1810.2 | 19.0 | 15.1 |
| | 2125.2 | 21.5 | 14.8 |
| | 2388.7 | 24.8 | 13.6 |
| | 2609.2 | 27.8 | 12.7 |
| | 2912.4 | 30.9 | 12.1 |
| | 3224.2 | 34.9 | 11.3 |
| | 3655.9 | 41.0 | 10.6 |
| | 4159.2 | 46.8 | 10.2 |
| | 4930.4 | 50.9 | 10.0 |
| | 5461.9 | 51.5 | 10.0 |
| | 6421.4 | 51.7 | 10.4 |
| | 7767.6 | 52.0 | 10.3 |
| | 8511.9 | 52.3 | 10.3 |
| Disk L poly(2-vinylpyridine) | 0.0 | 12.4 | 19.9 |
| | 43.7 | 11.9 | 19.6 |
| | 141.5 | 12.8 | 19.1 |
| | 224.9 | 13.4 | 18.5 |
| | 336.9 | 15.8 | 20.3 |
| | 501.5 | 14.8 | 18.3 |
| | 577.5 | 16.7 | 19.7 |
| | 779.1 | 18.2 | 19.5 |
| | 930.1 | 18.9 | 18.9 |
| | 1161.6 | 18.6 | 16.7 |
| | 1428.7 | 20.3 | 15.8 |
| | 157.19 | 21.5 | 15.4 |
| | 1810.2 | 23.6 | 14.6 |
| | 2125.2 | 26.5 | 13.8 |
| | 2388.7 | 30.8 | 12.5 |
| | 2609.2 | 33.8 | 11.7 |
| | 2912.4 | 37.0 | 11.3 |
| | 3224.2 | 41.7 | 10.8 |
| | 3655.9 | 48.3 | 10.5 |
| | 4159.2 | 49.5 | 10.4 |
| | 4930.4 | 49.7 | 10.3 |
| | 5461.9 | 49.9 | 10.3 |
| | 6421.4 | 50.3 | 10.6 |
| | 7767.6 | 50.6 | 10.6 |
| | 8511.9 | 51.2 | 10.6 |
| Disk M proton sponge | 0.0 | 10.7 | 21.3 |
| | 43.7 | 12.5 | 20.3 |
| | 141.5 | 14.1 | 19.6 |
| | 224.9 | 15.4 | 18.9 |
| | 336.9 | 20.2 | 20.7 |
| | 501.5 | 22.7 | 16.7 |
| | 577.5 | 27.4 | 17.0 |
| | 779.1 | 43.7 | 14.0 |
| | 930.1 | 46.4 | 12.6 |
| | 1161.6 | 45.7 | 11.6 |
| | 1428.7 | 46.5 | 11.2 |
| | 1571.9 | 46.8 | 11.2 |

TABLE 1-continued

| Disk (additive) | Exposure time (hrs) | % T | % R |
| --- | --- | --- | --- |
| | 1810.2 | 46.7 | 11.0 |
| | 2125.2 | 47.3 | 11.1 |
| | 2388.7 | 47.2 | 11.0 |
| | 2609.2 | 47.1 | 11.0 |
| | 2912.4 | 47.4 | 10.9 |
| Disk N acridine orange base | 0.0 | 10.5 | 21.6 |
| | 43.7 | 10.4 | 20.9 |
| | 141.5 | 10.7 | 20.2 |
| | 224.9 | 11.3 | 19.5 |
| | 336.9 | 14.3 | 21.7 |
| | 501.5 | 13.3 | 19.0 |
| | 577.5 | 14.8 | 20.3 |
| | 779.1 | 16.1 | 20.5 |
| | 930.1 | 16.6 | 20.0 |
| | 1161.6 | 17.0 | 17.4 |
| | 1428.7 | 20.8 | 15.5 |
| | 1571.9 | 23.1 | 14.8 |
| | 1810.2 | 27.7 | 13.2 |
| | 2125.2 | 37.4 | 11.7 |
| | 2388.7 | 43.7 | 11.2 |
| | 2609.2 | 44.5 | 11.0 |
| | 2912.4 | 45.0 | 10.9 |
| Disk O triethanolamine | 0.0 | 12.5 | 20.1 |
| | 43.7 | 13.0 | 19.0 |
| | 141.5 | 15.2 | 18.3 |
| | 224.9 | 16.0 | 17.7 |
| | 336.9 | 19.9 | 19.3 |
| | 501.5 | 19.7 | 16.8 |
| | 577.5 | 23.2 | 17.6 |
| | 779.1 | 33.1 | 14.9 |
| | 930.1 | 46.4 | 12.6 |
| | 1161.6 | 46.1 | 11.3 |
| | 1428.7 | 47.1 | 10.9 |
| | 1571.9 | 47.8 | 10.9 |
| | 1810.2 | 47.6 | 10.8 |
| | 2125.2 | 48.2 | 10.8 |
| | 2388.7 | 48.3 | 10.8 |
| | 2609.2 | 47.9 | 10.7 |
| | 2912.4 | 48.4 | 10.6 |
| Disk P tyramine | 0.0 | 13.0 | 18.8 |
| | 43.7 | 13.7 | 17.7 |
| | 141.5 | 16.4 | 17.0 |
| | 224.9 | 17.1 | 16.7 |
| | 336.9 | 20.9 | 18.6 |
| | 501.5 | 19.9 | 16.4 |
| | 577.5 | 22.8 | 17.4 |
| | 779.1 | 27.1 | 16.8 |
| | 930.1 | 32.2 | 15.4 |
| | 1161.6 | 42.0 | 11.7 |
| | 1428.7 | 47.6 | 11.3 |
| | 1571.9 | 48.5 | 11.2 |
| | 1810.2 | 48.6 | 11.1 |
| | 2125.2 | 49.3 | 11.1 |
| | 2388.7 | 49.1 | 11.1 |
| | 2609.2 | 49.4 | 11.0 |
| | 2912.4 | 49.4 | 11.0 |

As can be seen from the foregoing data, the presence of the four nitrogen containing compounds of the present invention comparatively delays the onset of degradation as observed by an increase in percent transmittance and a decrease in reflectance. Optical information media containing one of the compounds of the present invention would therefore exhibit a longer useful life.

EXAMPLE 2

The effect of adding a nitrogen containing compound in accordance with the present invention to other layers in the optical information storage medium was tested separately, and the results of those tests are included in the table that follows.

Table 2 demonstrates the effect of a sink on the stability of silicon naphthalocyanine optical disks exposed to an 80° C./80% relative humidity accelerated aging environment. The sink was a layer of the nitrogen containing compound coated underneath the protective cover of the air sandwich recording medium.

In the Table, the first column lists the disk type and type of sink employed. The second column lists the length of time the disks were exposed to the 80° C./80% RH accelerated aging environment. The third and fourth columns list the transmission and reflectance factors that correspond to the various exposure times, respectively.

TABLE 2

| Disk (additive) | Exposure time (hrs) | % T | % R |
| --- | --- | --- | --- |
| AA Control, no sink | 0.0 | 9.9 | 29.0 |
| | 41.44 | 44.4 | 12.8 |
| | 122.12 | 49.2 | 12.5 |
| | 228.79 | 49.7 | 12.3 |
| | 364.66 | 49.9 | 12.2 |
| | 640.05 | 50.1 | 12.3 |
| BB poly(2-vinylpyridine) | 0.0 | 10.5 | 28.9 |
| | 41.44 | 11.5 | 25.9 |
| | 122.12 | 12.0 | 25.3 |
| | 228.79 | 12.8 | 23.0 |
| | 364.66 | 14.3 | 18.8 |
| | 642.05 | 15.8 | 15.4 |
| FF Control, no sink | 0 | 10.9 | 30.4 |
| | 144 | 31.1 | 15.4 |
| | 288 | 33.5 | 14.7 |
| | 408 | 34.4 | 14.5 |
| | 576 | 34.9 | 14.6 |
| | 696 | 35.2 | 14.6 |
| | 864 | 35.3 | 14.2 |
| | 1032 | 35.4 | 14.1 |
| | 1200 | 35.6 | 14.1 |
| | 1440 | 35.5 | 13.9 |
| | 1704 | 35.6 | 13.8 |
| | 2016 | 35.9 | 13.7 |
| GG pentaethylene hexamine | 0 | 10.8 | 30.4 |
| | 144 | 13.3 | 22.8 |
| | 288 | 19.9 | 10.3 |
| | 408 | 24.0 | 7.4 |
| | 576 | 28.0 | 8.6 |
| | 696 | 28.4 | 8.0 |
| HH poly(2-vinylpyridine) | 0 | 10.9 | 30.4 |
| | 144 | 10.6 | 29.3 |
| | 288 | 11.9 | 27.3 |
| | 408 | 13.4 | 25.0 |
| | 576 | 18.4 | 16.3 |
| | 696 | 21.5 | 11.3 |

Figure 2:
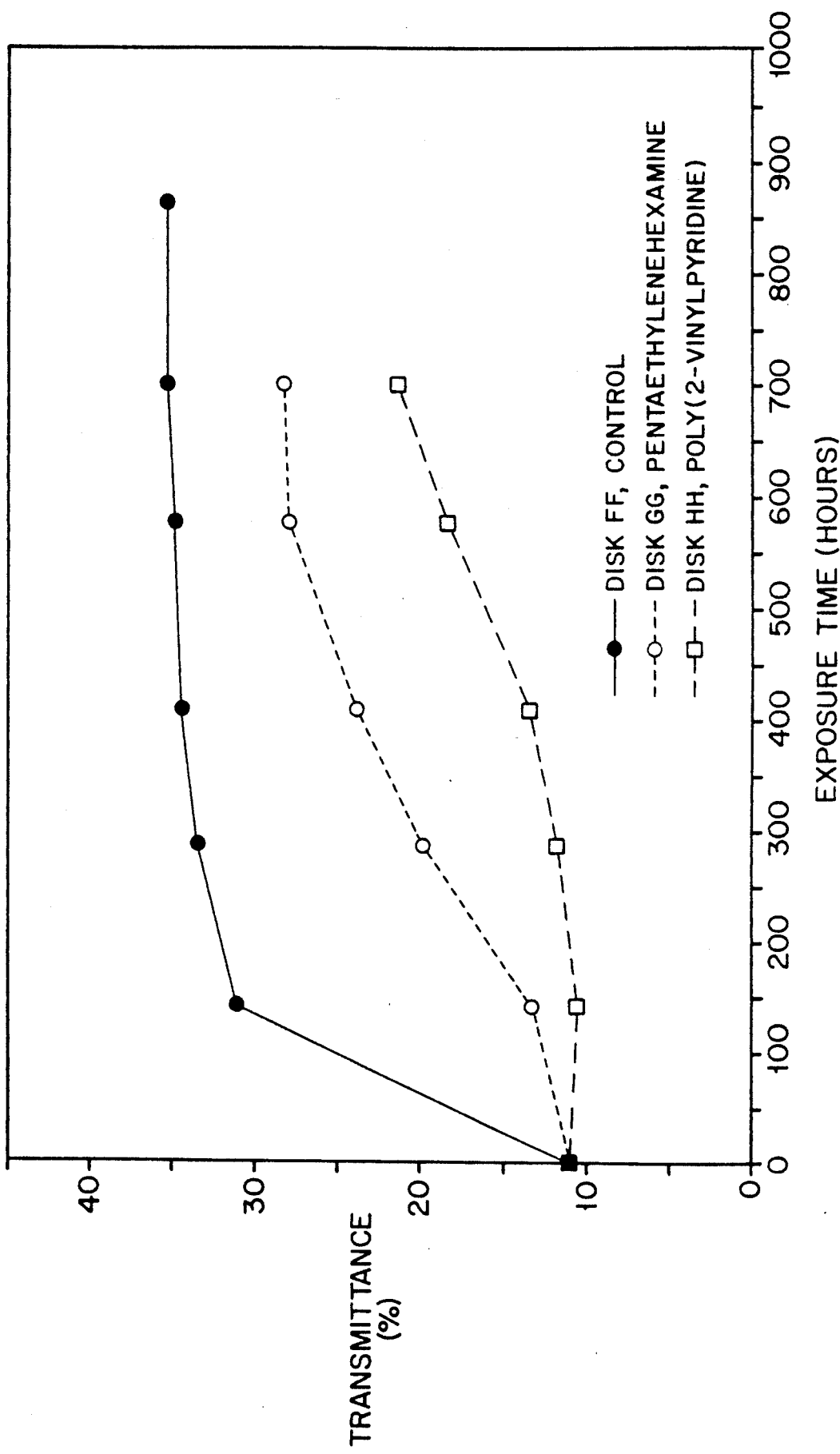

The data in Table 2 above clearly indicates the beneficial results realized when utilizing the compounds of the present invention. To better illustrate these beneficial results, the data in Table 2 has been graphically depicted in FIGS. 1 and 2 of the Drawing.

Although the invention has been described with preferred embodiments, it is to be understood that variations and modifications may be resorted to as will be apparent to those skilled in the art. Such modifications and variations are to be considered within the purview and the scope of the claims appended hereto.

What is claimed is:

1. A method for stabilizing an optical information recording medium containing an information layer for the storage of optical information, on a substrate, wherein said substrate comprises polycarbonate or epoxy resin, said method comprising incorporating pentaethylene hexamine into the medium in an amount ranging from about 1 weight percent to about 30 weight percent of the information layer.

2. A method for stabilizing an optical information recording medium containing an information layer for the storage of optical information, on a substrate, wherein said substrate comprises polycarbonate or epoxy resin, said method comprising incorporating acridine orange base into the medium in an amount ranging from about 1 weight percent to about 30 weight percent of the information layer.

3. The method for stabilizing an optical information recording medium as described claim 1 or claim 2, wherein said information layer comprises a film forming naphthalocyanine, phthalocyanine, anthracyanine, or phenanthracyanine chromophore.

4. An optical information recording medium containing an information layer for the storage of optical information, on a substrate, wherein said substrate comprises polycarbonate or epoxy resin, said information layer comprising pentaethylene hexamine in an amount ranging from about 1 weight percent to about 30 weight percent of the information layer.

5. An optical information recording medium containing an information layer for the storage of optical information, on a substrate, wherein said substrate comprises polycarbonate or epoxy resin, said information layer comprising acridine orange base in an amount ranging from about 1 weight percent to about 30 weight percent of the information layer.

6. The optical information recording medium as described in claim 4 or claim 5, wherein said information layer comprises a naphthalocyanine, phthalocyanine, anthracyanine, or phenanthracyanine chromophore.

7. A method for stabilizing an optical information recording medium containing an information layer for the storage of optical information adhered to a substrate, wherein said substrate comprises polycarbonate or epoxy resin, said method comprising incorporating as a distinct component an organic base selected from the group consisting of pentaethylene hexamine, acridine orange base and mixtures thereof, into the medium in an amount ranging from about 1 weight percent to about 30 weight percent of the information layer.

8. The method as described in claim 7, wherein said organic base is incorporated as a coating on the inside of a protective cover layer.

9. The method as described in claim 7, wherein said organic base is incorporated as part of said substrate.

* * * * *